(12) United States Patent
Hamlin et al.

(10) Patent No.: US 11,337,146 B2
(45) Date of Patent: May 17, 2022

(54) SYSTEMS AND METHODS FOR SECURE DISCOVERY AND WAKE FOR WIRELESS DOCKING OF INFORMATION HANDLING SYSTEM

(71) Applicant: Dell Products L.P., Round Rock, TX (US)

(72) Inventors: Daniel L. Hamlin, Round Rock, TX (US); Manuel Novoa, Leander, TX (US); Vivek Viswanathan Iyer, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/910,618

(22) Filed: Jun. 24, 2020

(65) Prior Publication Data
US 2021/0410049 A1 Dec. 30, 2021

(51) Int. Cl.
*H04W 48/16* (2009.01)
*H04W 48/10* (2009.01)
*H04W 76/11* (2018.01)
*H04W 52/02* (2009.01)

(52) U.S. Cl.
CPC .......... *H04W 48/16* (2013.01); *H04W 48/10* (2013.01); *H04W 52/0229* (2013.01); *H04W 76/11* (2018.02)

(58) Field of Classification Search
CPC ....... H04W 80/08; H04W 4/12; H04W 48/16; H04W 52/0229; H04W 76/11; H04W 48/10
See application file for complete search history.

(56) References Cited

U.S. PATENT DOCUMENTS

| | | | |
|---|---|---|---|
| 2015/0312891 A1* | 10/2015 | Quinn | H04W 4/02 455/452.1 |
| 2017/0265033 A1* | 9/2017 | Quinn | H04W 4/02 |
| 2020/0229206 A1* | 7/2020 | Badic | H04W 4/023 |

* cited by examiner

*Primary Examiner* — Diane D Mizrahi
(74) *Attorney, Agent, or Firm* — Jackson Walker L.L.P.

(57) ABSTRACT

An information handling system may include a processor, a management controller communicatively coupled to the processor and configured to provide out-of-band management facilities for the management of the information handling system, the management controller further configured to generate a unique identifier associated with the information handling system and a network interface communicatively coupled to the processor and the management controller and configured to encapsulate the unique identifier in a datagram for wireless communication to a wireless docking station and broadcast the datagram. The management controller may be further configured to, in response to receiving a response datagram from the wireless docking station, wake the information handling system.

8 Claims, 2 Drawing Sheets

SYSTEMS AND METHODS FOR SECURE DISCOVERY AND WAKE FOR WIRELESS DOCKING OF INFORMATION HANDLING SYSTEM

TECHNICAL FIELD

The present disclosure relates in general to information handling systems, and more particularly systems and methods for secure discovery and wake for wireless docking of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user of an information handling system may couple, either via a wired or wireless connection, the information handling system to a docking station, which may also be referred to as a port replicator or dock. A docking station may comprise a system, device, or apparatus that enables a coupled information handling system to communicatively couple to information handling resources (e.g., keyboard, monitor, mouse, external storage resources, network interfaces, etc.) attached to or integral to the docking station.

For wireless docking stations, it may be desirable to allow a mobile information handling system to securely discover an associated wireless docking station and/or vice-versa. For example, when the information handling system is in an active state and the information handling system approaches the wireless docking station, it may be desirable to allow the information handling system to discover and couple to the wireless docking station. As another example, when the information handling system is in a sleep/standby state and the information handling system approaches the wireless docking station, it may be desirable to allow the information handling system to discover and couple to the wireless docking station and to wake the information handling system. As a further example, when the information handling system is in a sleep/standby state and the information handling system is already proximate to the wireless docking station, it may be desirable to allow a user to wake the information handling system by interacting with a keyboard, mouse, or other input device attached to the docking station. As an additional example, when the information handling system is in a sleep/standby state and the information handling system approaches a wireless docking station to which the information handling system is not primarily docked (e.g., the wireless docking station typically docks with an different user or information handling system), it may be desirable to prevent the information handling system from discovering and coupling to the wireless docking station and to prevent waking the information handling system.

However, using existing approaches, there exists no defined manner in which a wireless docking station may perform detection of an information handling system, or vice versa, and initiate low-level device interactions (e.g., a wake event from a keyboard press to wake the information handling system).

SUMMARY

In accordance with the teachings of the present disclosure, the disadvantages and problems associated with secure discovery and wake of an information handling system interfacing with a wireless docking station may be reduced or eliminated.

In accordance with embodiments of the present disclosure, an information handling system may include a processor, a management controller communicatively coupled to the processor and configured to provide out-of-band management facilities for the management of the information handling system, the management controller further configured to generate a unique identifier associated with the information handling system and a network interface communicatively coupled to the processor and the management controller and configured to encapsulate the unique identifier in a datagram for wireless communication to a wireless docking station and broadcast the datagram. The management controller may be further configured to, in response to receiving a response datagram from the wireless docking station, wake the information handling system.

In accordance with these and other embodiments of the present disclosure, a method may include generating a unique identifier associated with an information handling system, encapsulating the unique identifier in a datagram for wireless communication to a wireless docking station, broadcasting the datagram, and in response to receiving a response datagram from the wireless docking station, waking an information handling system.

In accordance with these and other embodiments of the present disclosure, a wireless docking station may include a wireless docking interface configured to receive a datagram from an information handling system, the datagram including a unique identifier associated with the information handling system and a policy manager configured to determine if the information handling system is authorized for docking to the wireless docking station based on the unique identifier and responsive to determining that the information handling system is authorized for docking to the wireless docking station, enable input devices of the wireless docking station to receive user input for interacting with the information handling system.

In accordance with these and other embodiments of the present disclosure, a method may include receiving at a wireless docking station a datagram from an information handling system, the datagram including a unique identifier associated with the information handling system, determining at the wireless docking station if the information handling system is authorized for docking to the wireless docking station based on the unique identifier, and responsive to determining that the information handling system is authorized for docking to the wireless docking station, enabling input devices of the wireless docking station to receive user input for interacting with the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
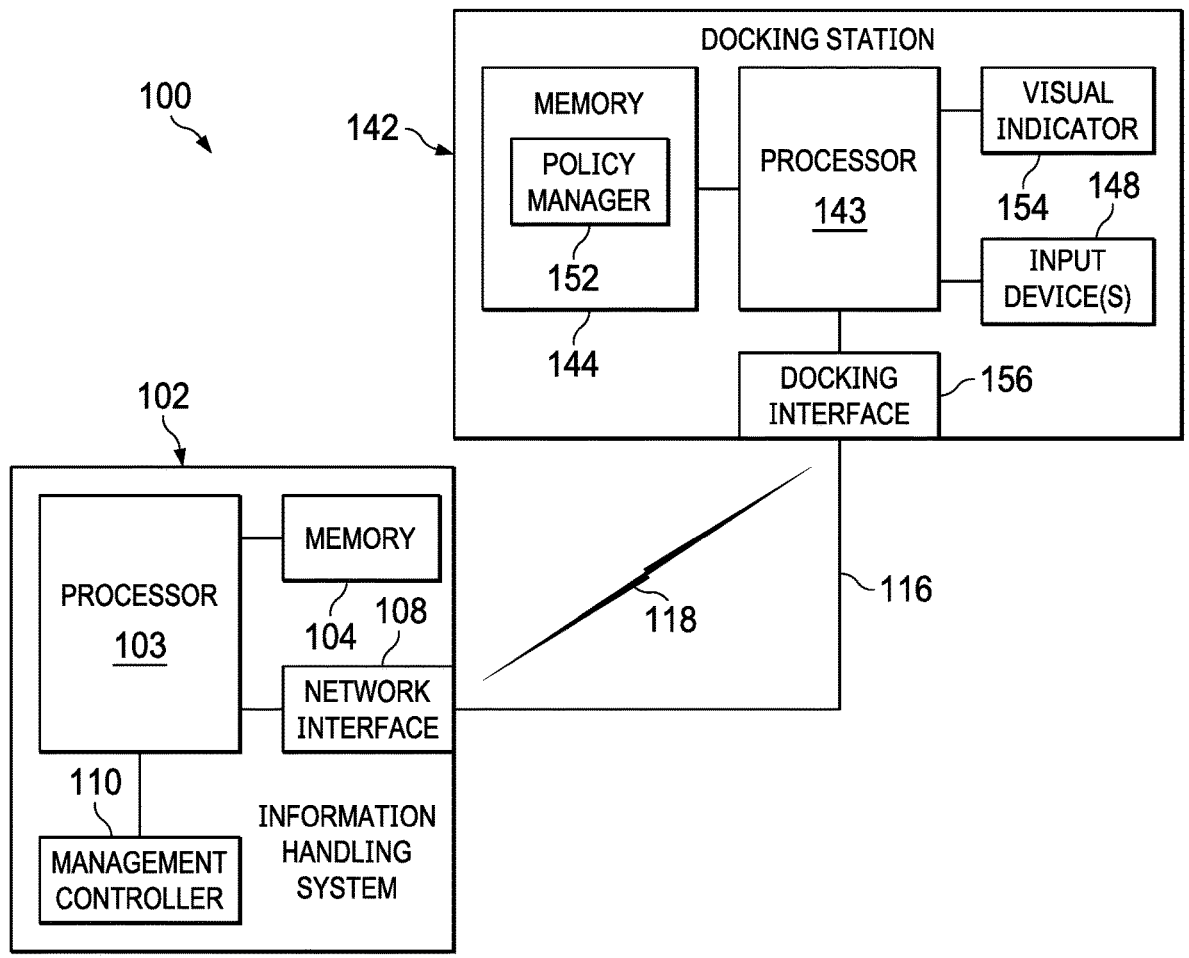
FIG. 1 illustrates a block diagram of an example system including an information handling system and a wireless docking station, in accordance with certain embodiments of the present disclosure.
Figure 3:
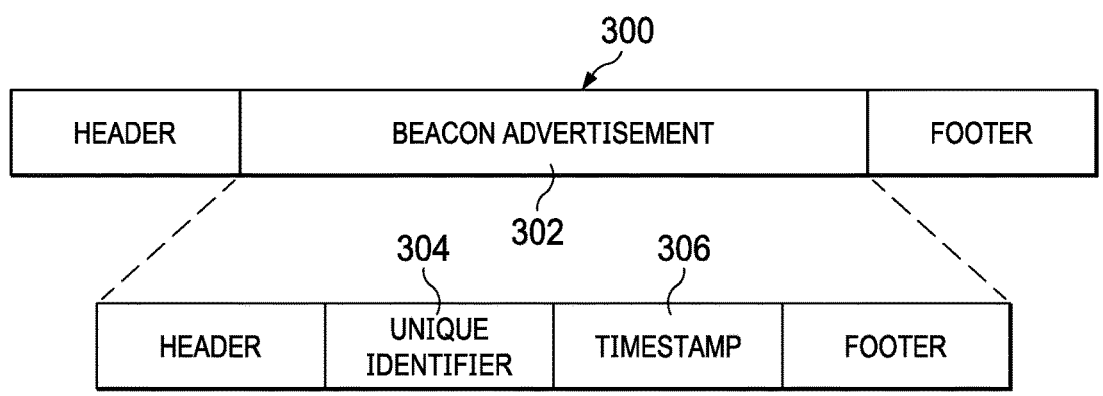
FIG. 3 illustrates an example datagram for communicating a beacon advertisement, in accordance with certain embodiments of the present disclosure.
Figure 2:
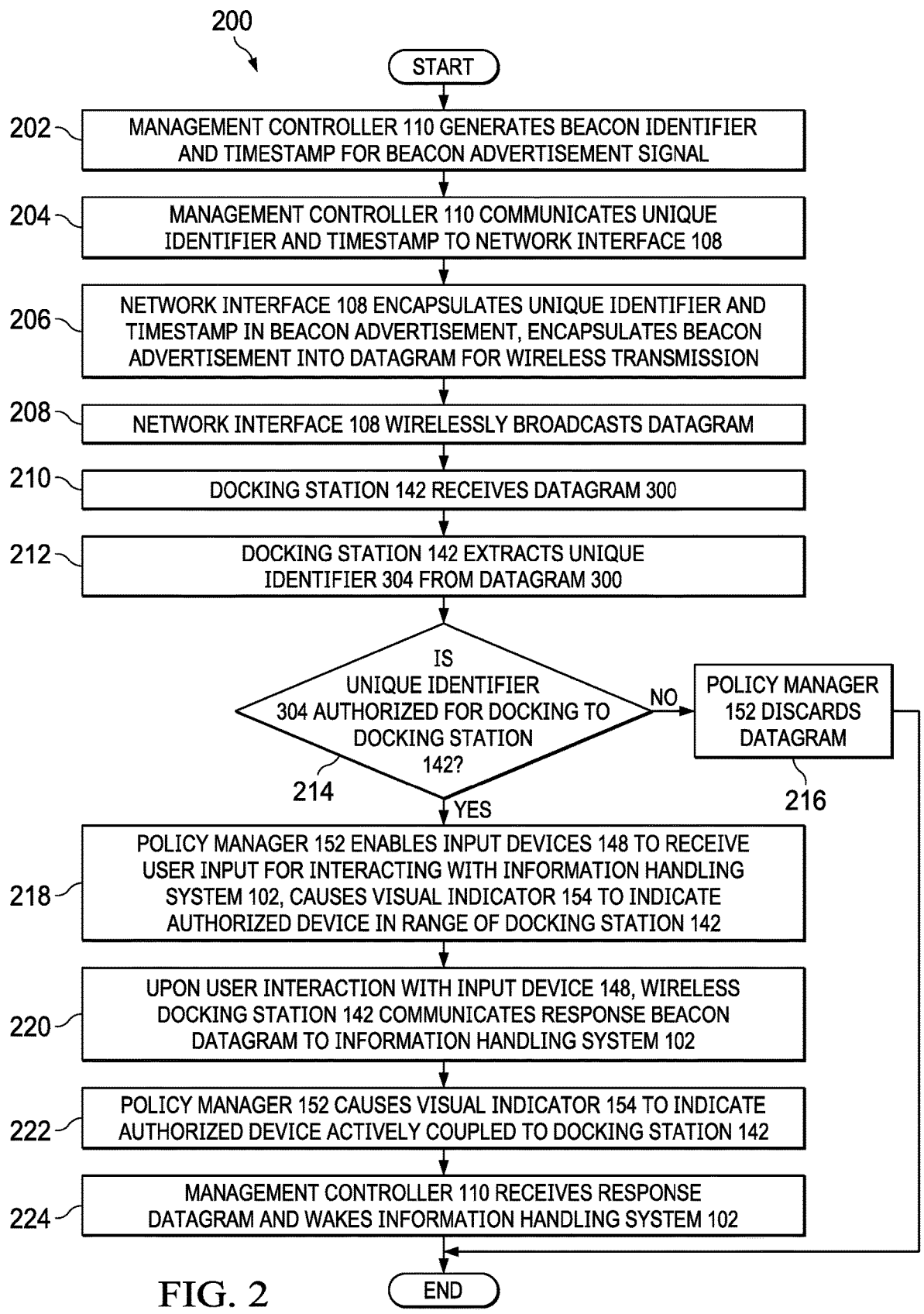
FIG. 2 illustrates a flow chart of an example method for secure discovery and wake between an information handling system and a wireless docking station, in accordance with certain embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), IEEE 802.11ad (Wireless Gigabit or "WiGig"), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example system 100 including an information handling system 102 and a wireless docking station 142, in accordance with certain embodiments of the present disclosure.

In some embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, and a management controller 110 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Network interface 108 may comprise any suitable system, apparatus, or device operable to serve as an interface between information handling system 102 and another information handling system and/or a network. Network interface 108 may enable information handling system 102 to communicate using any suitable transmission protocol and/or standard. In some embodiments, network interface 108 may be configured to communicate with docking interface 156 of docking station 142 via wire-line transmissions 116. In these or other embodiments, network interface 108 may be configured to communicate with docking interface 156 of docking station 142 via wireless transmissions 118. In these and other embodiments, network interface 108 may comprise a network interface card, or "NIC."

Management controller 110 may be configured to provide out-of-band management facilities for management of information handling system 102. Such management may be made by management controller 110 even if information handling system 102 is powered off or powered to a standby state. In certain embodiments, management controller 110 may include or may be an integral part of an embedded controller (EC), a baseboard management controller (BMC), a remote access controller (e.g., a Dell Remote Access Controller or Integrated Dell Remote Access Controller), or an enclosure controller. In other embodiments, management controller 110 may include or may be an integral part of a chassis management controller (CMC).

In addition to processor 103, memory 104, network interface 108, and management controller 110, information handling system 102 may include one or more other information handling resources.

Docking station 142 may comprise a docking station, port replicator, or dock that allows information handling system 102 or another electronic device to communicatively couple to information handling resources (e.g., keyboard, monitor, mouse, external storage resources, network interfaces, etc.) attached to or integral to docking station 142. Docking station 142 may allow information handling system 102 to communicatively couple to docking station 142 (and thus the devices communicatively coupled to docking station 142) via wire-line transmissions 116 and/or wireless transmissions 118 communicated between network interface 108 and docking interface 156. In some embodiments, docking station 142 may comprise an information handling system, albeit with functionality and/or structure different than that of information handling system 102. As depicted in FIG. 1, docking station 142 may include a processor 143, a memory 144 communicatively coupled to processor 143, one or more input devices 148 communicatively coupled to processor 143, a visual indicator 154 communicatively coupled to processor 143, and a docking interface 156 communicatively coupled to processor 143.

Processor 143 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 143 may interpret and/or execute program instructions and/or process data stored in memory 144 and/or another component of docking station 142.

Memory 144 may be communicatively coupled to processor 143 and may include any system, device, or apparatus configured to retain program instructions and/or data for a period of time (e.g., computer-readable media). Memory 144 may include RAM, EEPROM, a PCMCIA card, flash memory, magnetic storage, opto-magnetic storage, or any suitable selection and/or array of volatile or non-volatile memory that retains data after power to docking station 142 is turned off. Memory 144 may be either internal or external to docking station 142.

As shown in FIG. 1, memory 144 may have stored thereon a policy manager 152. Policy manager 152 may include any system configured to, as described in greater detail elsewhere in this disclosure, maintain and enforce a policy regarding identities of devices (e.g., information handling system 102) that may be coupled to docking station 142 via wireless transmissions.

Input devices 148 may comprise any system, device, or apparatus configured to receive user input or an indication of user input. For example, input devices 148 may include a power button, keyboard, mouse, or other suitable input device.

Visual indicator 154 may comprise any suitable system, apparatus, or device configured to provide a human-perceptible visual indication of an event or status associated with docking station 142. For example, in some embodiments, visual indicator 154 may comprise a light-emitting diode indicating whether or not an information handling system 102 is wirelessly docked with docking station 142.

Docking interface 156 may comprise any suitable system, apparatus, or device operable to serve as a communications interface between docking station 142 and network interface 108 of information handling system 102. Docking interface 156 may be configured to communicate with network interface 108 of information handling system 102 via wire-line transmissions 116 and/or wireless transmissions 118.

In addition to processor 143, memory 144, and docking interface 156, docking station 142 may include one or more other information handling resources.

FIG. 2 illustrates a flow chart of an example method 200 for secure discovery and wake between an information handling system and a wireless docking station, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, management controller 110 may utilize a unique identifier (e.g., serial number, Media Access Control number, service tag, etc.) associated with management controller 110 or information handling system 102 to generate a beacon identifier and a timestamp which may be embedded within a beacon advertisement signal. At step 204, management controller 110 may communicate the unique identifier and timestamp to network interface 108. At step 206, network interface 108 (e.g., utilizing Bluetooth firmware or any other firmware for wireless transmissions) may encapsulate the unique identifier and timestamp in a beacon advertisement, which beacon advertisement may itself be encapsulated in a datagram (e.g., datagram 300 depicted in FIG. 3) for wireless transmission. At step 208, network interface 108 may wirelessly broadcast or advertise the datagram. Such communication may occur periodically, so as to allow continuous discovery of information handling system 102 by wireless docking station 142.

Turning briefly to FIG. 3, FIG. 3 illustrates an example datagram 300 for communicating a beacon advertisement, in accordance with certain embodiments of the present disclosure. As shown in FIG. 3, datagram 300 may have encapsulated therein a beacon advertisement 302, which itself may encapsulate therein a unique identifier 304 associated with management controller 110 or information handling system 102, and a timestamp 306 generated by management controller 110.

At step 210, docking station 142 may, if within wireless communication range of information handling system 102, receive datagram 300. At step 212, docking station 142 may extract the unique identifier 304 from datagram 300. At step 214, policy manager 152 may determine whether the unique identifier 304 is authorized for docking to docking station 142. If unique identifier 304 is authorized for docking to docking station 142, method 200 may proceed to step 218. Otherwise method may proceed to step 216.

At step 216, responsive to unique identifier 304 being unauthorized for docking to docking station 142, policy manager 152 may discard the datagram. After completion of step 216, method 200 may end.

At step 218, responsive to unique identifier 304 being authorized for docking to docking station 142, policy manager 152 may enable input devices 148 to receive user input for interacting with information handling system 102. Policy manager 152 may cause visual indicator 154 (e.g., by causing visual indicator 154 to display a particular color of light) to indicate an authorized device is in range of docking station 142.

At step 220, upon user interaction with an input device 148 (e.g., user pressing of a power button, pressing one or more keys on a keyboard attached to docking station 142, moving a mouse attached to docking station 142), wireless docking station 142 may communicate a response beacon datagram to information handling system 102. Such datagram may include timestamp 306 from datagram 300 received by docking station 142, so that management controller 110 may validate connectivity to wireless docking station 142. In other words, management controller 110 may also employ policy to selectively restrict or allow communication from wireless docking station 142.

At step 222, policy manager 152 may cause visual indicator 154 (e.g., by causing visual indicator to display another particular color of light) to indicate an authorized device is actively coupled to docking station 142.

At step 224, in response to receiving the response beacon datagram, management controller 110 may wake information handling system 102 (assuming information handling system 102 is not already in a sleep/standby mode).

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A wireless docking station comprising:
   a wireless docking interface configured to receive a datagram from an information handling system, the datagram including a unique identifier associated with the information handling system; and
   a policy manager configured to:
   determine, based on the unique identifier, whether the information handling system is authorized for docking to the wireless docking station; and
   responsive to determining that the information handling system is authorized for docking to the wireless docking station, enable input devices of the wireless docking station to receive user input for interacting with the information handling system.

2. The wireless docking station of claim 1, wherein the policy manager is further configured to, responsive to determining that the information handling system is authorized for docking to the wireless docking station, communicate a response datagram to the information handling system.

3. The wireless docking station of claim 1, wherein the policy manager is further configured to, responsive to determining that the information handling system is authorized for docking to the wireless docking station, causing a visual indicator of the wireless docking station to indicate that an authorized device is in range of the wireless docking station.

4. The wireless docking station of claim 3, wherein the policy manager is further configured to, responsive to user interaction with an input device of the wireless docking station, causing the visual indicator to indicate that the authorized device is actively coupled to the wireless docking station.

5. A method comprising:
   receiving at a wireless docking station a datagram from an information handling system, the datagram including a unique identifier associated with the information handling system;
   determining at the wireless docking station-if, based on the unique identifier, whether the information handling system is authorized for docking to the wireless docking station; and
   responsive to determining that the information handling system is authorized for docking to the wireless docking station, enabling input devices of the wireless docking station to receive user input for interacting with the information handling system.

6. The method of claim 5, further comprising responsive to determining that the information handling system is authorized for docking to the wireless docking station, communicate a response datagram to the information handling system.

7. The method of claim 5, further comprising responsive to determining that the information handling system is authorized for docking to the wireless docking station, causing a visual indicator of the wireless docking station to indicate that an authorized device is in range of the wireless docking station.

8. The method of claim 7, further comprising responsive to user interaction with an input device of the wireless docking station, causing the visual indicator to indicate that the authorized device is actively coupled to the wireless docking station.

* * * * *

UNITED STATES PATENT AND TRADEMARK OFFICE
CERTIFICATE OF CORRECTION

PATENT NO. : 11,337,146 B2
APPLICATION NO. : 16/910618
DATED : May 17, 2022
INVENTOR(S) : Hamlin et al.

It is certified that error appears in the above-identified patent and that said Letters Patent is hereby corrected as shown below:

In the Claims

In Column 10, Claim 5, Line 6, delete "station-if, based" and insert -- station, based --, therefor.

Signed and Sealed this
Sixth Day of December, 2022

Katherine Kelly Vidal
*Director of the United States Patent and Trademark Office*